Dec. 29, 1953     D. W. HAMM     2,664,328
PISTON RING CONSTRUCTION
Filed June 5, 1952
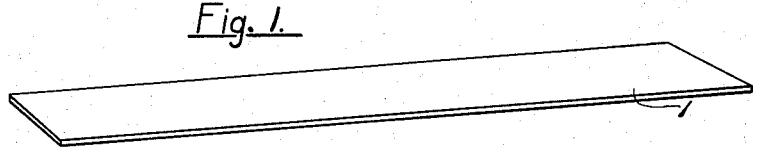
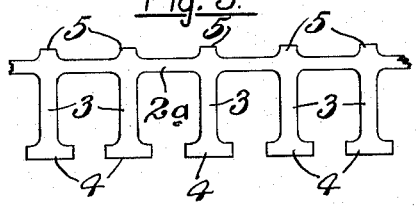
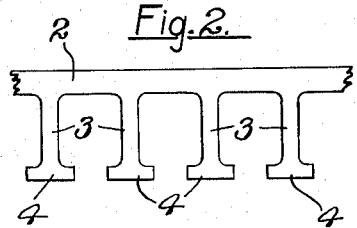
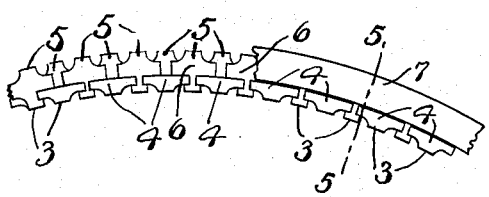
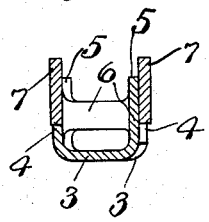
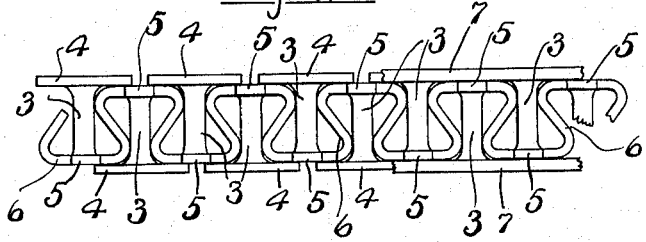
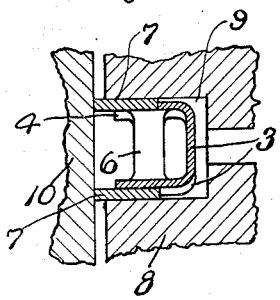
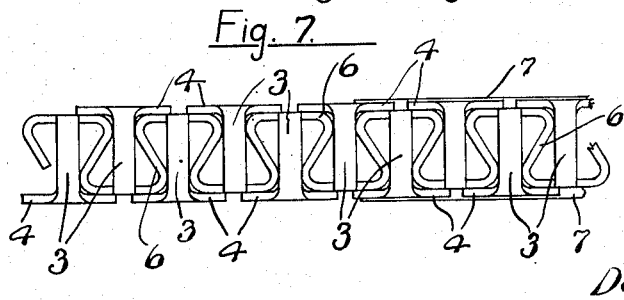
INVENTOR.
Douglas W. Hamm
BY
Frank E. Liverance, Jr.
Attorney.

Patented Dec. 29, 1953

2,664,328

UNITED STATES PATENT OFFICE 2,664,328

PISTON RING CONSTRUCTION

Douglas W. Hamm, Muskegon, Mich., assignor to Muskegon Piston Ring Company, Muskegon, Mich., a corporation of Michigan Application June 5, 1952, Serial No. 291,869

4 Claims. (Cl. 309—24)

This invention relates to a piston ring construction and is more particularly directed to rings which are used in the lower, so-called oil ring grooves of the pistons of internal combustion engines, the rings being constructed to serve the function of gathering or scraping oil from the walls of engine cylinders, directing it through the piston rings which have vent passages for passing the oil and thence to the bottoms of the ring grooves in the pistons from which it is drained through passages leading from the piston ring grooves to the interiors of the pistons.

It is a primary object and purpose of the present invention to provide a novel and very effective ring made from thin gauge metal, in practice preferably steel, and which utilizes upper and lower thin steel rails of generally circular form which, at their outer curved edges, bear against the cylinder walls in spaced relation to each other, providing in effect the upper and lower sides of an oil receiving groove for the oil which is removed from the cylinder walls.

Such thin steel rails having little or no tension therein caused by closing them at their gaps, must have force directed against them at their inner edges so that at their outer curved edges they will bear with a desired unit pressure against the cylinder walls of internal combustion engines. The conventional oil ring and one which has been used for several years includes the two spaced rails, a spacer between them, which in most cases is of cast iron and which has oil vents or passage openings through it, and a steel spring expander adapted to be located in a piston ring groove back of both rails and said spacer. When such ring is installed in a ring receiving groove of a piston, with the piston installed in an engine cylinder, the inner spring expander is stressed or distorted with a generation of a resisting force therein which is imparted to the rails, and at times to the spacer to supply the force which pushes the rails against a cylinder wall.

With my invention, the spring expander is eliminated and a circumferentially compressible combined spacer and force exerting expander is used to support, hold and space the rails and also force said steel rails outwardly to engage at their outer curved edges against the cylinder wall of an internal combustion engine. A very practical, useful and novel piston ring is provided in which the pressure exerted at the inner edges of the rails is at a large number of closely spaced points, being far more uniform in application to the steel rails than is the force which is supplied by the usual corrugated spring expander, the points of application of the force thereof to the steel rails being far more widely separated.

A three-part composite piston ring of the oil collecting and conserving type is made, all parts being made of thin steel of substantially the same gauge, two of the parts being identical in the two steel rails used. There is economy in manufacture and the attainment of better operation and results. An understanding of the invention may be had from the following description, taken in connection with the accompanying drawing, in which, Fig. 1 is a perspective view of a length of thin metal, known as a ribbon thereof, from which the combined spacer and expander element of the piston ring is made.

Fig. 2 is a plan view of one form of structure which is produced after the ribbon thin metal of Fig. 1 has been suitably processed by dies, this being the first step of operation in manufacturing the novel spacer and expander.

Fig. 3 is a similar plan view showing a slightly modified form from which the spacer and expander is made, both forms shown in Figs. 2 and 3 producing substantially, and in function effect, identically the same combined spacer and expander.

Fig. 4 is a fragmentary plan view of an assembled piston ring using said combined spacer and expander, and the steel rails for the complete piston ring of my invention.

Fig. 5 is a transverse section through the completed piston ring enlarged, taken substantially on the plane of line 5—5 of Fig. 4.

Fig. 6 is a fragmentary enlarged elevation illustrating the completed piston ring of my invention, such elevation being taken looking at the outer curved side of the piston ring.

Fig. 7 is a similar fragmentary elevation taken at the opposite or inner side of the piston ring, and Fig. 8 is a fragmentary vertical section through adjacent parts of a piston and cylinder in which the piston is installed, showing the piston ring of my invention in a piston ring groove of the piston in transverse vertical cross section.

Like reference characters refer to like parts in the different figures of the drawing.

From thin ribbon stock, preferably of steel which may be approximately .020" to .025" in thickness, as indicated at 1 in Fig. 1, the third member of the ring, the combined spacer and expander, is made by first, through suitable die operations, cutting and fabricating the strip to the forms indicated in Fig. 2 or 3. That is, at one longitudinal side edge there is left a continuous narrow strip 2 from which, at equally spaced distances, arms 3 extend outwardly at right angles parallel to each other, each terminating in a widened head portion 4 as shown. In the form shown in Fig. 3, the narrow strip portion 2 at its outer edge and directly opposite each of the arms 3 is provided with a projecting lug 5 by cutting or otherwise removing metal from the strip 2 for a portion of its width, leaving a narrower continuous strip 2a from which the arms 3 and lugs 5 project opposite to the other.

The elongated strip of material after being thus processed is further processed by shaping the strip 2 or 2a into a continuous series of corrugations. The corrugated strip is indicated at 6, with alternate corrugations closed at their upper and lower ends, respectively. The form and shape of the corrugations may be varied to some degree but they are of a generally U-shape, with the legs of the U preferably converging toward each other away from the closed ends of the corrugations.

After thus being formed, the arms 3 are bent, one from the inner edge of each of the closed ends of the corrugations, alternately in opposite directions. That is, one arm will be bent downwardly from the upper closed end of a corrugation, the next from the closed end of the next adjacent corrugation and continued alternately for the entire length of the corrugated portion of the ring. And after, or simultaneously with such bending, the enlarged heads are bent at right angles outwardly closing the alternate upper and lower open ends of the corrugations so that when completed, at its upper side there is a plurality of the heads 4 as shown in Fig. 4 extending partly over the open ends of corrugations and partly over the closed ends of the adjacent corrugations. The outer edges of the heads 4 will be spaced inwardly from the outer ends of the lugs 5 and will bear against the corrugated member only for a short distance adjacent the inner edges of the corrugated strip, into which the elongated strips 2 or 2a have been formed and shaped.

When thus formed and shaped the spacer and expander is completed. At the upper and lower sides of said spacers the usual thin steel rail 7 may be located. The inner edges of the rails bear against the free longitudinal edges of the heads 4 at both the upper and lower sides of the piston ring. And the inner sides of the rail 7 rest not only upon the closed ends of the generally U-shaped corrugations but also upon the upper and lower sides of the lugs 5 in the form of a ring made from the blank shown in Fig. 3; while in the form made from the blank shown in Fig. 2, they will rest upon the closed ends of the corrugations made from the strip 2 which, in width, is equal to the combined width of the strip 2a and the distance outwardly that the lugs 5 project therefrom.

Such piston ring when assembled, as shown in Figs. 5 and 8, may be located in a piston ring oil groove 9 of a piston 8. When installed for use within the walls 10 of a cylinder, the outer curved edges of the rails 7 bear against the inner sides of the cylinder walls. The spacer and expander, parted at one side as is common in piston rings, when installation is made have the ends at the parting abut against each other and the spacer and expander is circumferentially compressed, the corrugations yielding under the compression.

This generates a force which acts through the heads 4 which have bearing shoulders against the inner edges of the rails 7 tending to force them outwardly under the tendency of the spacer and expander to return to its original unstressed condition.

The piston ring provided, and the spacer and expander element thereof are of a very practical and useful character. The rails 7 at their outer edge portions are held with a requisite bearing pressure against the cylinder wall, excess oil is removed and directed inwardly to the ring and, passing through the spacer and expander, goes to the bottom of the ring groove 9 and drained therefrom through the passage to the interior of the piston, as indicated in Fig. 8.

The invention is defined in the appended claims and is to be considered comprehensive of all forms of structure coming within their scope.

I claim:

1. In a piston ring, a circumferentially compressible corrugated member of generally circular outline comprising, successive generally U-shaped corrugations, successive corrugations having alternate successive open and closed ends at both the upper and lower sides of said member, and arms, one integral with each closed end of each corrugation extending therefrom axially and at the inner side of said member to opposite upper and lower sides thereof, terminating each in a head bridging the open end of its associated corrugation, and providing a successive series of shoulders inwardly of the outer portions of said member, at both the upper and lower sides thereof, against which the inner curved edges of thin metallic rails are adapted to engage, the inner sides of said rails being adapted to bear against the closed ends of the corrugations.

2. In a piston ring, a circumferentially compressible corrugated member of generally circular outline, comprising a succession of generally U-shaped corrugations alternately having open and closed ends at upper and lower sides of the member, and shoulder means integrally connected with said member located at its upper and lower sides bridging across the open ends of said corrugations and located inwardly from the outer edges of the closed ends of the corrugations and adjacent the inner edges thereof, whereby thin metallic circular rails are adapted to engage at their inner edges against said shoulder means and bear at their inner sides against the closed ends of said corrugations.

3. In a piston ring, a circumferentially compressible corrugated member of generally circular outline, comprising a succession of generally U-shaped corrugations alternately having open and closed ends at upper and lower sides of the ring, and a succession of shoulder means integrally connected with said member located at its upper and lower sides, each bridging an open end of a corrugation and extending partly over the closed ends of the next adjacent corrugations, said shoulder means having outer edges back of the outer edges of the closed ends of said corrugations and adjacent the inner edges thereof, adapting said member to have thin circular steel rails located at inner edges thereof thereagainst, and with said rails, at their inner sides, bearing against major portions of the areas of the closed ends of said corrugations.

4. A construction having the elements defined in claim 3, said closed ends of the corrugations at their outer edges thereof having outwardly extending projections for increasing the areas against which steel rails are adapted to bear.

DOUGLAS W. HAMM.

References Cited in the file of this patent

UNITED STATES PATENTS

| Number | Name | Date |
|---|---|---|
| 2,397,220 | Teetor | Mar. 26, 1946 |
| 2,432,602 | Zahodiakin | Dec. 16, 1947 |